United States Patent [19]

Fleming et al.

[11] 4,166,414
[45] Sep. 4, 1979

[54] CROP-LOADING-RESPONSIVE FLUID SUPPLY CIRCUIT IN BALE DENSITY CONTROL SYSTEM

[75] Inventors: Garold L. Fleming, Hesston; George Yatcilla, Newton, both of Kans.

[73] Assignee: Hesston Corporation, Hesston, Kans.

[21] Appl. No.: 940,439

[22] Filed: Sep. 7, 1978

[51] Int. Cl.² ............................................. B30B 15/30
[52] U.S. Cl. ....................................... 100/43; 100/45; 100/192
[58] Field of Search ................... 100/43, 179, 192, 45, 100/DIG. 8, 191

[56] References Cited

U.S. PATENT DOCUMENTS

| | | | |
|---|---|---|---|
| 2,576,784 | 11/1951 | Dodds | 100/43 |
| 2,582,672 | 1/1952 | Bobst | 100/43 |
| 2,708,872 | 5/1955 | Lauck | 100/43 |
| 2,718,189 | 9/1955 | Bornzin | 100/43 |
| 2,763,201 | 9/1956 | Hauswirth | 100/43 |
| 2,796,825 | 6/1957 | Kreigbaum | 100/43 |
| 2,890,646 | 6/1959 | Soteropulos | 100/43 |
| 2,982,201 | 5/1961 | Kruger | 100/191 X |
| 3,015,262 | 1/1962 | Baines | 100/43 |
| 3,121,387 | 2/1964 | Fuhrwerk | 100/43 |
| 3,866,529 | 2/1975 | Holman | 100/43 |

Primary Examiner—Billy J. Wilhite

Attorney, Agent, or Firm—Schmidt, Johnson, Hovey & Williams

[57] ABSTRACT

An "extrusion" type baler controls bale density by regulating the size of the discharge orifice of the bale case, and the "squeeze" cylinders which provide power for changing the size of the orifice are hydraulically connected to a special pump associated with the plunger of the machine so that pressurized oil is added to or taken away from the cylinders depending upon the resistive force encountered by the plunger and its pump during the compaction stroke. The loader which stuffs a new charge of material up into the baling chamber ahead of the retracted plunger may, under certain circumstances, fail to load a new charge of material. The plunger, however, continues to reciprocate at all times and would thus add an additional slug of oil to the cylinders following deactivation of the loader but for the presence of a special control valve in the circuit which precludes flow of oil from the pump to other components of the circuit unless the loader has been operated through a loading stroke immediately prior to the next compaction stroke of the plunger. When a predetermined pressure level is achieved in the circuit, a relief path will open so as to depressurize the cylinders by an incremental amount.

5 Claims, 5 Drawing Figures

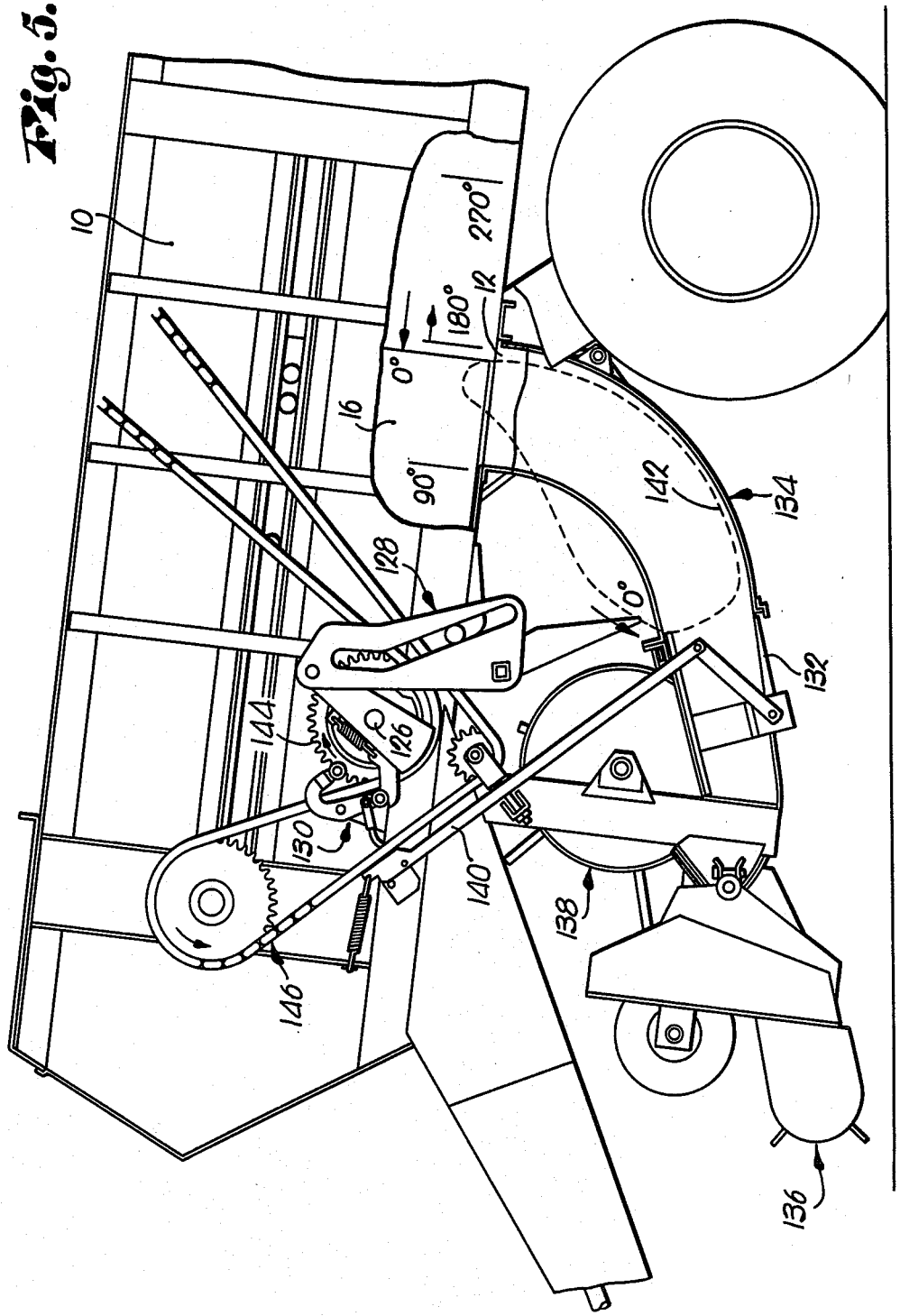

CROP-LOADING-RESPONSIVE FLUID SUPPLY CIRCUIT IN BALE DENSITY CONTROL SYSTEM

TECHNICAL FIELD

This invention relates to controlling the density of bales produced in an extrusion-type baler.

BACKGROUND ART

Prior copending applications titled "Bale Density Control System" filed Feb. 28, 1978, Ser. No. 882,132 in the name of Yatcilla et al. and "Plunger Drive Connection in Bale Density Control System" filed Feb. 28, 1978, Ser. No. 882,133 in the name of Graber et al disclose and claim certain features of a hydraulic bale density control system for use in connection with extrusion-type balers. Said system involves the use of a single-acting pump mechanically associated with the plunger in such a way that during each compaction stroke of the plunger a slug of pressurized oil is added to the hydraulic control circuit so as to maintain pressure on squeeze cylinders that control the size of the discharge orifice of the bale case. If the pressure level in the circuit reaches a certain predetermined level, then a relief path is opened momentarily so as to slightly depressurize the squeeze cylinders. On the other hand, if the pressure level is not achieved, then each additional slug of oil to the squeeze cylinders increases their holding force against the forming bale as it moves through the orifice, thereby progressively increasing the density of the bale.

There is a check valve within the circuit that prevents oil from the pump from reaching the squeeze cylinders unless the pressure on the pump side of said check valve exceeds the pressure on the squeeze cylinder side of the check valve. While this check valve is a desirable part of the system for reasons which need not be elaborated upon herein, it also creates certain problems as a result of the unique way in which the baling chamber is loaded by "perfectly" prepared charges of hay having predetermined characteristics of size and density, all as explained, for example, in prior U.S. application Ser. No. 737,472 filed Nov. 1, 1976, now U.S. Pat. No. 4,106,268, in the names of White et al and titled "Method and Apparatus for Loading and Baling Crop Material".

As described, claimed and shown in said White et al application, while one charge of hay is being compacted in the baling chamber by the plunger, the next charge of material is being prepared in a loading duct adjacent the baling chamber. The optimum size and density of the charge accumulating in said duct may or may not be reached prior to the time the plunger is ready to compact the next charge. If the next charge is indeed ready, then a loader will stuff the precompressed and properly sized charge into the baling chamber ahead of the retracted plunger, whereupon the charge is compacted by the plunger in the usual way.

On the other hand, if the charge accumulating in the duct has not yet obtained the desired characteristics of size and density by the time the plunger is ready to compact that charge, then the loader is temporarily deactivated, at least for that compaction cycle of the plunger, in order to provide additional time for more material to accumulate in the duct. If the charge is ready to be loaded by the time the plunger is to commence its next compaction cycle, then the loader will indeed stuff the properly prepared charge up into the baling chamber for compaction by the plunger.

It has been noted that when the bale density control systems as disclosed in the aforementioned Yatcilla et al and Graber et al applications are incorporated into the baler of the aforementioned White et al application, temporary deactivation of the loader so that the plunger has no material to compact during its compaction stroke has the effect of giving a false indication of bale density to the control circuit to the end that additional, unneeded oil is pumped to the squeeze cylinders by the pump and plunger.

This is due to the fact that, although there is no new charge of material in the baling chamber for the plunger to engage and pack rearwardly, nonetheless the material compacted on the previous plunger stroke has sufficient resilience to bulge back into the plunger compaction area a sufficient extent that it will provide a certain amount of resistance to the plunger. If such resistance were nonexistent, then, even though oil was available from the pump to the circuit on the pump side of the earlier-mentioned check valve, the check valve would not be opened because the pressure of the circuit on the squeeze cylinder side would be considerably greater than that on the pump side. Hence, no additional oil would be added to the squeeze cylinders.

However, as is normally the case, the bulging material from the prior compaction stroke of the plunger coupled with the new slug of oil from the pump, creates sufficient resistance to raise the pressure level in the circuit on the pump side above that on the squeeze cylinder side of the check valve, thereby opening the latter and allowing the squeeze cylinders to be further pressurized by the pump.

The net effect of further pressurizing the squeeze cylinders when such additional pressurization is neither wanted or desirable is to have the cylinders substantially over-pressurized when the next charge of material is actually loaded into the baling chamber and the plunger attempts to pack the same against the overly restricted orifice. That particular compaction stroke of the plunger may result in an excessively densified portion of the bale compared to those previously compacted, and it may take several plunger strokes before the density returns down to its most desirable level. It may also allow extreme loads to the baler during this time, which are not desirable.

SUMMARY OF THE INVENTION

According to the present invention, a special control valve is inserted into the bale density control circuit on the pump side of the check valve and is made responsive to operation of the material loader so that the hydraulic line from the pump to the check valve is only opened by the control valve if the loader has indeed supplied the bale chamber with a charge of material for the plunger to compact. If, instead of operating, the loader has been deactivated for that compaction stroke of the plunger, the control valve keeps the line between the pump and the check valve closed so that no falsely generated slug of oil can be added to the squeeze cylinders.

BRIEF DESCRIPTION OF THE DRAWINGS

In the drawings:

FIG. 1 is a largely schematic view of a density control system that is responsive to the loading or nonloading of new material into the baling chamber in accordance with the principles of the present invention;

FIG. 2 is an isolated view of a valve forming a part of such system and showing the same actuated so as to relieve pressure in the squeeze cylinders;

FIG. 3 is an enlarged, fragmentary detail view inside the bale case of the machine showing the way in which the control valve forming a part of the present invention is coupled with the loader which stuffs new charges of material up into the baling chamber;

FIG. 4 is a fragmentary, cross-sectional view of said control valve and the operating cam therefor taken substantially along line 4—4 of FIG. 3; and FIG. 5 is a fragmentary, side elevational view of a baler with which the bale density control system of the present invention may be incorporated.

DETAILED DESCRIPTION OF THE INVENTION

Figures 1, 2, 3, 4:
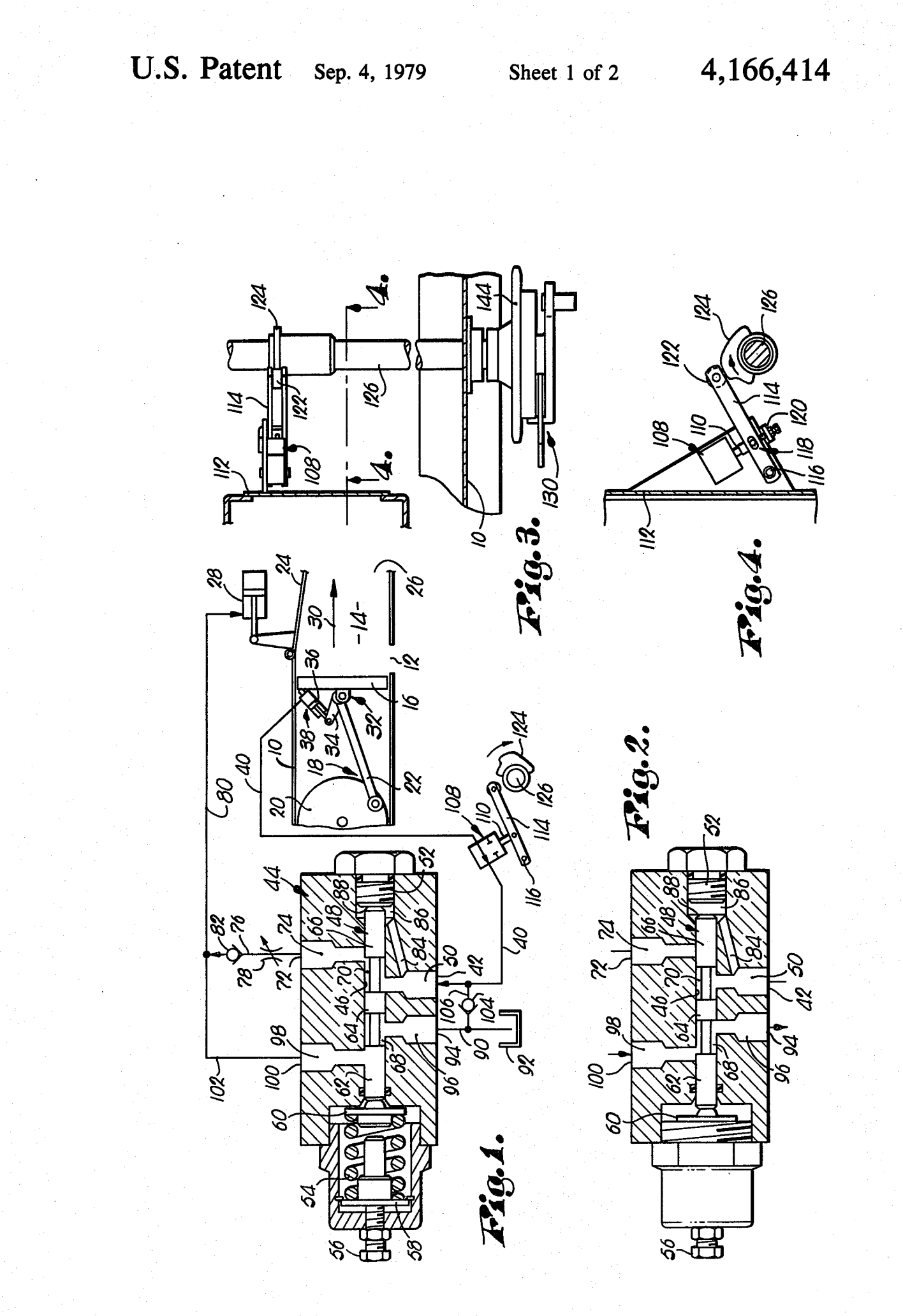

As illustrated in FIG. 1, the bale case 10 has a lateral opening 12 through which material to be baled is introduced into the baling chamber 14. A plunger 16 is reciprocated within the chamber 14 by apparatus 18 that may take the form of a rotating drive wheel 20 and a pitman rod 22 disposed in cranked relationship to the axis of rotation of the wheel 20. Laterally shiftable structure which may take the form of a wall 24 of the bale case 10 cooperates with the remainder of the latter to define a discharge orifice 26 whose dimensions may be restricted relative to the remainder of the bale case 10 through one or more devices in the nature of a hydraulically powered "squeeze" cylinder 28 coupled mechanically with the shiftable wall 24. Thus, the reciprocating plunger 16 packs material through the bale case 10 in the direction of the arrow 30 and against the resistance afforded by the constricted nature of the orifice 26. The process is therefore akin to an extrusion operation.

The pitman rod 22 has a special lost-motion connection 32 with the plunger 16. In the preferred form, a pair of such rods 22 are utilized, and the connections 32 of the rod 22 are such that, during the compaction stroke of the plunger 16, one or more cranks 34 are rocked clockwise viewing FIG. 1 to move the ram 36 of a single-acting pump cylinder 38 through a positive pressure pumping stroke, the end of the cylinder 38 remote from the cranks 34 being connected to the plunger 16. On the retraction stroke of plunger 16, the cranks 34 withdraw the ram 36. Further details may be found in said Yatcilla et al and Graber et al applications.

The cylinder 38 on the side of ram 36 opposite the cranks 34 is connected with a hydraulic control circuit via a line 40 leading to a high pressure port 42 in a valve body 44. Port 42 communicates with a bore 46 in the body 44 that slidably receives a spool 48, such communication being by way of a passage 50. The spool 48 is yieldably biased in a rightward direction viewing FIG. 1 against a plug 52 by a compression spring 54 at the end of spool 48 opposite the plug 52. The extent of bias from the spring 54 may be adjusted by appropriately rotating adjusting screw 56 which bears against a plate 58 that in turn engages the proximal end of the spring 54 to compress the latter against an opposite plate 60 having engagement with the spool 48.

The spool 48 is provided with three lands 62, 64 and 66 separated by a pair of annular regions 68 and 70 on opposite sides of the land 64. When the spool 48 is in the position of FIG. 1 against the plug 52, the inlet port 42 is in communication with an outlet port 72 via a passage 74 leading from the region 70 that is in turn connected with the passage 50. A high pressure line 76 leads from the port 72 through a restricted port or orifice 78 and connects with a line 80 leading to the rod side of the squeeze cylinder 28, there being a check valve 82 in line 76 to permit flow in the latter only in a direction toward squeeze cylinder 28 and only if the pressure on the pump side of check valve 82 exceeds the pressure on the squeeze cylinder side thereof.

A pilot passage 84 extending diagonally through the valve body 44 from the passage 50 communicates the inlet port 42 with a pilot chamber 86 at the rightmost end of the bore 46. The right end of the spool 48 has a circumferential bevel 88 exposed to the fluid pressure within pilot chamber 86.

A dump line 90 of the circuit leading to reservoir 92 is connected to an outlet port 94 that communicates with region 68 via a passage 96. Central land 64 blocks communication between the passages 50 and 96 at all times, while land 62 controls communication between passage 96 and another passage 98 leading from port 100, the latter in turn being connected to the line 80 via a line 102. In a similar way, land 66 at the right end of the spool 48 controls communication of the passages 50 and 74 with one another. A check valve 104 in a short line 106 between lines 40 and 90 permits fluid flow between such lines only in the direction toward the pump 38 during negative displacement of the latter on a retraction or suction stroke.

OPERATION OF THE STRUCTURE THUS FAR DESCRIBED

The spool 48 is normally in its rightmost position of FIG. 1. This opens the rod side of the squeeze cylinder 28 to fluid from the pump 38 along an operating pressure path defined by line 40, port 42, passage 50, region 70, passage 74, port 72, line 76 and line 80. Thus, as the plunger 16 is shifted through a compaction stroke toward the right end of the bale case 10 viewing FIG. 1, a slug of oil is forced from the pump 38 along such operating path.

During such a pumping stroke on the part of the pump 38, the oil along the operating path has no choice but to flow to the squeeze cylinder 28 (assuming the pressure on the pump side of the circuit is sufficient to unseat check valve 82), inasmuch as all routes to the reservoir 94 are blocked so long as the spool 48 remains in its FIG. 1 position. Note in this regard that the check valve 104 closes line 106 to the reservoir 92; land 64 closes off communication between passage 50 and passage 96; and, although line 102 may be pressurized, the fluid therein is prevented from dumping to the reservoir 92 by virtue of the blockage by land 62 of the passage 98.

On each retraction stroke of the plunger 16 in a leftward direction viewing FIG. 1, the pump 38 is drawn through a suction stroke by the cranks 34. The effect of this stroke is to unseat the check valve 104 so as to allow an increment of fluid to be drawn from the reservoir 92 through the line 106 and into the operating path of the circuit. Note that the check valve 82 in line 76 prevents the pump 38 from drawing any fluid out of the squeeze cylinder 28 at this time.

As a result of this pumping action on the part of the pump 38, the operating path is progressively pressurized to a greater and greater degree, thereby increasing the "squeeze" of the shiftable wall 24 on the bale that is being advanced through the chamber 14 by the reciprocating plunger 16. That, in turn, increases the resistance of the bale to advancement by the plunger 16, hence increasing the compactive force of the latter on the fresh charges of material entering through the inlet 12. The compact force applied by the plunger 16 is likewise transmitted to the circuit through the pump 38 via its mechanical connection with the plunger 16.

Fluid pressure in the operating path is also transmitted to the pilot chamber 86 and hence to the bevel 88 on spool 48 via the pilot line 84. Once that pressure reaches a level sufficient to overcome the resistance of the spring 54, the spool 48 will be shifted leftwardly such as to the opposite extreme position illustrated in FIG. 2. This has the immediate effect of opening a pressure relief path from the squeeze cylinder 28 via the line 80, line 102, port 100, passage 98, region 68, passage 96, port 94 and line 90 into the reservoir 92. At the same time, the land 66 moves into blocking relationship to the passage 74 so that further pressurized fluid from the pump 38 will not be admitted to the squeeze cylinder 28. This, then, has the effect of relieving the squeeze on the bale emerging through the orifice 26 so as to in turn reduce the bale's resistance to movement by the plunger 16, thereby keeping the compactive force of the latter from exceeding a selected level that corresponds with the setting of the adjusting screw 56 against the compression spring 54.

Parenthetically, it should be noted that once land 66 blocks passage 74, pump 38 can no longer make a pumping stroke (or complete one that may have been started).

Relief of the squeeze cylinder 28 will occur on the compression stroke of the plunger 16 at a time when the pump 38 attempts to add additional fluid into the operating path. Thus, as long as sufficient pressure from the pump 38 is present during a compaction stroke to maintain the spool 48 shifted leftwardly as in FIG. 2, the squeeze cylinder 28 will be relieved. Immediately upon beginning the retraction stroke of the plunger 16, the pressure in pilot chamber 86 will, of course, decrease so that the spring 54 will return the spool 48 to its original condition such that the squeeze cylinder 28 is no longer relieved. Moreover, relieving the squeeze cylinder 28 has the effect also of relieving the pressure in the pilot chamber 86 in view of the fact that the resistance to bale movement by the plunger 16 may be diminished slightly so as to accordingly reduce the pressure applied by the ram 36 of the pump 38.

Of importance is the fact that, in the preferred form, the squeeze cylinder 28 is normally operating at a lower pressure than that existing in the pilot chamber 86. This pressure differential is desirable due to the fact that the pressure required at the squeeze cylinder 28 to achieve a certain compressive force by the plunger 16 may fluctuate widely depending upon such things as moisture content and the nature of the materials being baled. For example, certain crops may exhibit a relatively high coefficient of friction with respect to their movement along the walls of the bale case 10. Thus, lower squeeze pressures would be required at the cylinder 28 in order to result in a certain compressive force by the plunger 16 than would be true with materials which would more easily slide through the bale case 10. In those latter instances, it would be necessary to squeeze the material more tightly in order to achieve the same resistance to movement and, thus, the same compressive or compactive force by the plunger 16.

To accommodate these fluctuations in applied pressure at the squeeze cylinder 28, then, it is preferred that the above-mentioned pressure differential be introduced between the squeeze cylinder 28 and the pilot chamber 86. This can be accomplished at least in part by careful calibration of the various ports along the operating path of the circuit (which includes the port 42, passage 50, region 70, passage 74 and port 72 in the valve body 44). The relationship between the leftmost end of land 66 and the passage 74 can be critical in this regard. Additionally, an orifice 78, preferably of the adjustable type, can be provided in the line 76 leading from port 72 so as to facilitate achievement of the desired differential. Cylinder sizing of pump 38 and tension cylinder 28 is important for the desired differential.

ADDITIONAL STRUCTURE ACCORDING TO THE PRESENT INVENTION

The circuit heretofore partly described also includes a special control valve 108 interposed within the line 40 and having an axially reciprocable member 110 whose axial position determines whether the valve 108 is open or closed. As illustrated in FIG. 1, the member 110 is fully extended (by an internal spring not shown) so that the valve 108 is opened, but when the member 110 is fully retracted, as in FIG. 4, the valve 108 is closed.

As illustrated in FIGS. 3 and 4, the valve 108 is physically mounted on support structure 112 within the interior of the bale case 10. An operating lever 114 is pivoted at 116 to the supporting structure 112 and is connected intermediate its opposite ends to the member 110 via a pin and slot arrangement as illustrated only in FIG. 4, such pin and slot being collectively denoted by the numeral 118. An adjustable limit stop 120 determines the outmost extension of the member 110 and thus also the downwardmost rotation of the lever 114 about the pivot 116.

The outermost end of the lever 114 carries a following roller 122 positioned to be operably engaged by an irregular cam 124 secured to a transverse driven shaft 126 within the bale case 10. Hence, as the shaft 126 rotates in a clockwise direction as illustrated in FIG. 4, the cam 124 (which extends over substantially less than 180° of the shaft 126) is brought into and out of operating engagement with the follower 122 so as to thereby operate the member 110. The shaft 126, the cam 124, the follower 122 and the lever 114 may thereby be selectively referred to as "operating means" for the valve 108 and its member 110.

The shaft 126 projects through the bale case 10 on the left side of the latter as viewed from the rear thereof and is at that point coupled with a loader 128 for cyclically stuffing new charges of material up into the baling chamber 14 through the opening 12. Details of the loader 128 and other associated apparatus illustrated in FIG. 5 will not be dwelled upon herein in view of the fact that such details may be easily obtained by reference to the aforementioned White et al application.

Suffice it to point out, then, that actuation of the loader 128 is controlled by a clutch 130 which is in turn regulated by a sensing plate 132 in the bottom of an upwardly curved loading and accumulating duct 134 that leads up to the opening 12. Crop material is continuously picked up by the pickup 136 and is packed into the duct 134 by the constantly rotating packer 138 until the accumulating charge of material within the duct 134 reaches a sufficient size and density to depress the plate 132. Such depression of the plate 132 trips the clutch 130 via operating linkage 140 so that the loader 128 swings into action along the generally kidney-shaped path of travel denoted by the phantom lines 142. It will be readily understood that driving power is continuously supplied to a sprocket 144 of the clutch 130 by a chain and sprocket assembly 146 and that when the clutch 130 is tripped, driving power from the sprocket 144 is supplied to the shaft 126.

Hence, operation of the loader 128 affects the control valve 108 and, indeed, if the loader 128 is deactivated and does not operate, the control valve 108 is closed so that no fluid flows therethrough.

In this regard, the "home" position of the loader 128 as illustrated in FIG. 5 (designated by the "0°") corresponds to the condition of things in FIG. 4 wherein the cam 124 has swung the operating lever 114 counterclockwise off the limit stop 120 a sufficient extent as to retract the member 110 and thereby close the line 40 from the pump 38 to the valve body 44. Thus, if the loader 128 never moves from its home position of FIG. 5 during reciprocation of the plunger 16, likewise the shaft 126 will not rotate and the valve 108 will remain closed.

In the normal series of events, a properly densified and shaped charge of hay becomes accumulated within the loading duct 134 during a compaction stroke of the plunger 16 (from 90° to 270° as illustrated in FIG. 5). Thus, the sensing plate 132 becomes depressed such as to trip the clutch 130 in readiness for operating the loader 128 when the plunger 16 completes its compaction stroke and retracts to a 40° position. At this point in time, the loader 128 is activated along its operating path 142 to stuff the accumulated charge up into the baling chamber 14 in front of the retracting plunger 16, the bulk of such stuffing stroke being accomplished before the plunger has returned to a 135° position. Hence, the charge of hay is properly positioned within the chamber 14 directly ahead of the face of the plunger 16.

Inasmuch as the shaft 126 associated with the loader 128 has rotated in a clockwise direction viewing FIG. 4, this removes the cam 124 from underneath the follower 122 of the lever 114 such as to permit the internal spring (not shown) of the valve 108 to extend the member 110 as illustrated in FIG. 1 to the extent permitted by the limit stop 120 engaging the lever 114. This opens the line 40 so that the pump cylinder 38 can add a slug of pressurized oil to the squeeze cylinders 28 in the manner earlier described.

The cam 124 continues in a clockwise direction with its shaft 126 as the loader 128 returns toward its home position, thus once again bringing the cam 124 under the lever 114 and swinging the latter counterclockwise viewing FIG. 4 so as to retract the member 110 and close the valve 108 a short time prior to the loader 128 reaching its home position. If a proper charge has accumulated within the duct 134, the above-mentioned cycle will be repeated with the squeeze cylinders 28 being pressurised and/or depressurized to the extent needed as earlier described.

However, if the proper charge has not accumulated within the duct 134 by the time the loader 128 returns home, then the clutch 130 will not have been tripped, and the loader 128 will be deactivated for the ensuing compression stroke of the plunger 16. Likewise, the control valve 108 will remain closed.

Maintaining the control valve 108 closed and thus precluding the addition of pressurized oil to the squeeze cylinders 28 during deactivation of the loader 128 is important. Even when no new material is added to the baling chamber 14 by the loader 128, the plunger 16 experiences a certain resistance during its compression stroke as a result of encountering the previously compacted charge of material as it bulges back into the path of travel of the plunger 16. Ignoring for the moment the presence of the valve 108 and assuming that the line 40 is continuously open, such resistance by the previous charge may cause the pressure in the operating path of the circuit on the pump side of the check valve 82 (the line 40, port 42, passage 50, space 70, passage 74, port 72, line 76) to exceed the pressure in the circuit on the squeeze cylinder side of the check valve 82 (the line 80). In this event, the check valve 82 would be unseated, and additional oil would be pumped by the pump cylinder 38 to the squeeze cylinders 28, even though no new material was added into the baling chamber 14 for the plunger 16 to compact.

This false "reading" of the need for additional pressurization of the squeeze cylinders 28 can result in overpressurization to the extent that, when the loader 128 does finally have a properly prepared charge to load, the resistance to compaction by the plunger 16 of the finally loaded charge may be quite excessive.

However, by closing the supply line 40 from the pump 38 unless the loader 128 has indeed moved a new charge of hay up into the baling chamber 14, such a false reading cannot occur, to the end that more uniform density of bales prepared by the baler is achieved. It also prevents overloading of the drives on the unit.

We claim:

1. In a baler of the type wherein a reciprocating plunger progressively forms a bale by incrementally forcing the same through the restricted orifice of a baling chamber as a loader successively inserts new charges of material between the retracted plunger and the bale in timed relationship to reciprocation of the plunger, said orifice being at least partially defined by structure that is shiftable laterally with respect to the path of bale travel through said chamber for the purpose of enlarging or restricting said orifice, said structure having a fluid-pressure device coupled therewith for applying a holding force against movement of the structure in a direction to enlarge the orifice, said loader having control means associated therewith for temporarily deactivating the loader without interrupting reciprocation of the plunger, the improvement comprising:

a fluid-pressure circuit connected with said device for pressurizing the same to effect said holding force, said circuit including a fluid pump and a check valve between said pump and said device operable when closed to prevent fluid flow into said device from the pump for further pressurization of the device, said pump being operable during each compaction stroke of the plunger, if the pressure in said circuit on the pump side of said check valve exceeds the pressure in said circuit on the device side of said valve whereby to open said check valve, to add a slug of fluid to said device for further pressurization thereof, said circuit being responsive to pressure therein beyond a certain predetermined level to depressurize said device by an amount which reduces said holding force, said circuit further including a control valve on the pump side of said check valve operable when closed to preclude said addition of a slug of oil to the device by the pump and operable when open to permit said slug addition; and valve operating means responsive to operation of said loader for closing said control valve upon said deactivation of the loader.

2. In a baler as claimed in claim 1, wherein said control valve includes a member shiftable into and out of a position closing the control valve, said loader having structure associated therewith for holding said member shifted into said position when the loader is deactivated.

3. In a baler as claimed in claim 2, wherein said loader includes a shaft rotatable about its longitudinal axis during operation of the loader, said operating means including a laterally projecting cam on said shaft engageable with said member of the control valve upon rotation of the shaft.

4. In a baler as claimed in claim 3, wherein said member is yieldably biased away from said position.

5. In a baler as claimed in claim 4, and limit means engageable with said member for limiting said yieldable biasing of the member away from said position.